United States Patent Office 3,467,422
Patented Sept. 16, 1969

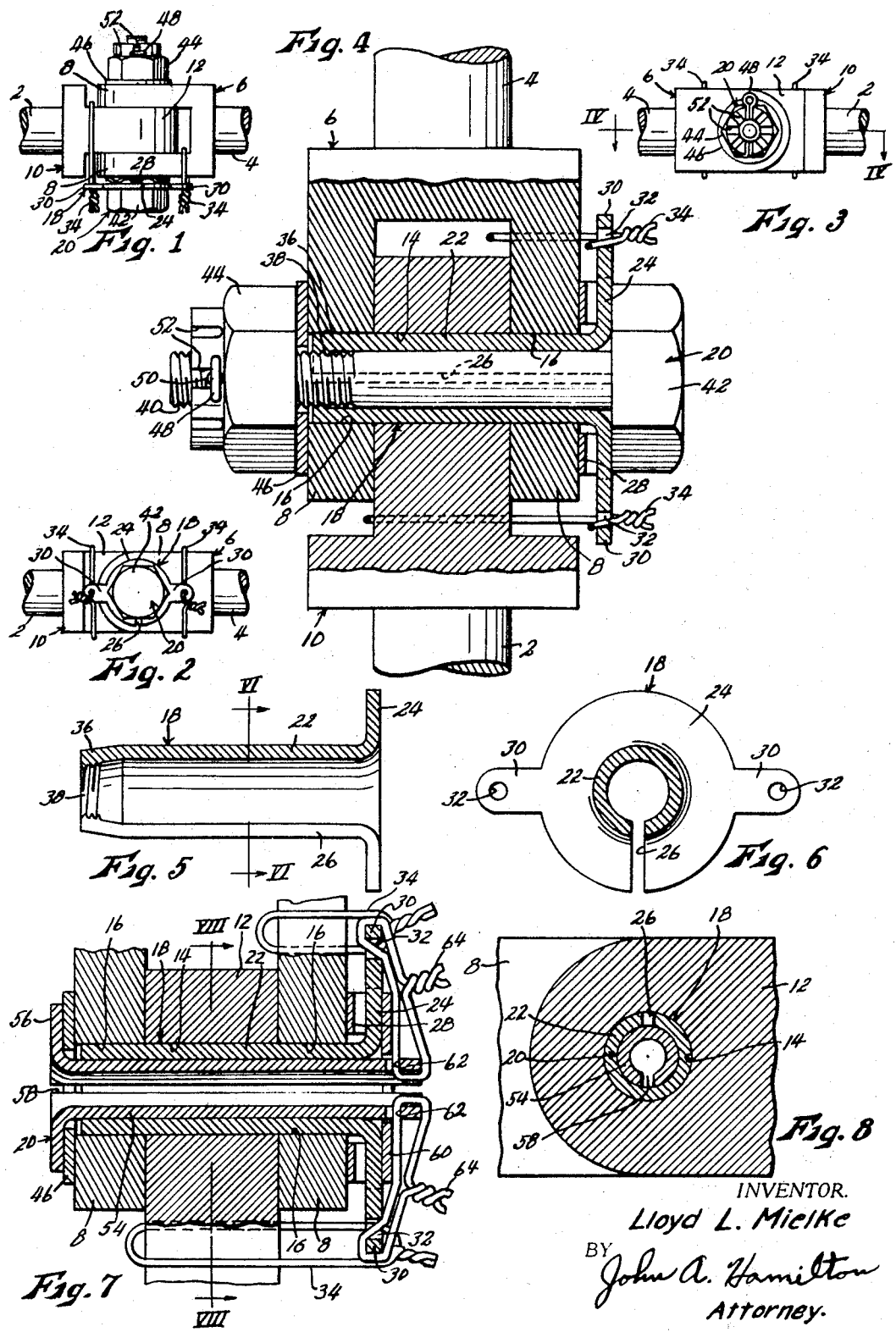

3,467,422
SAFETY PIVOT CONNECTION
Lloyd L. Mielke, 4125 Hawthorne Circle,
Kansas City, Mo. 64116
Filed May 24, 1967, Ser. No. 640,938
Int. Cl. F16c *11/00;* B25g *3/38;* F16d *27/00*
U.S. Cl. 287—100                                           3 Claims

ABSTRACT OF THE DISCLOSURE

This application discloses a safety pivot connection designed primarily for making pivotal connections in aircraft control linkages, said connection comprising essentially of a tubular safety sleeve insertable in matching holes of the links or other work pieces, a retainer member in the nature of a bolt insertable through said sleeve and retained therein to secure the sleeve in place by normal means such as a nut threaded on the bolt, and means independent of or cooperating with the bolt or other retainer to secure the sleeve in place in the event of the failure and loss of the bolt or other retainer, or parts thereof.

---

This invention relates to new and useful improvements in pivotal connections generally of the bolt type. It has been conceived and developed primarily for connecting links in aircraft control systems, where failure of the bolt or other member making the connection can obviously have catastrophic consequences, but as will readily appear it has many other uses and applications. Such connections are ordinarily made with bolts, and while various lock nuts and other safety devices have been devised for preventing accidental loss of the nut and/or the bolt itself, these have proven to be at best only partial solutions to the problem, since the bolt itself may fail, particularly as a result of fatigue caused by the severe vibration to which it is commonly subjected in aircraft usage, and particularly at points of normal stress concentration in the bolt such as at the roots of the bolt threads, or at the joinder of the bolt head and shank. Thus, the bolt head, or the nut and threaded portion of the bolt shank, sometimes fracture and fall away, with a subsequent and very real danger that the entire bolt will be lost and certain control functions sacrificed.

Accordingly, the principal object of the present invention is the provision of a pivotal connection of the character described which largely obviates any possibility of complete failure of the joint for any of the above causes, and which consequently represents a substantial advance in aircraft safety. Essentially, the safety connection as contemplated by the present invention comprises a tubular sleeve adapted to be inserted into the bolt holes of the work pieces, and a retainer member, which may constitute an ordinary bolt, inserted through the sleeve and having enlargements at its ends, such as the head and nut of said bolt, cooperating with the faces of the work pieces to secure both the bolt or other retainer, as well as the sleeve, in position. The sleeve is designed to maintain and carry the design load of the joint, in the event of the failure or even the complete loss of the bolt or other retainer member. Moreover, while the bolt or other retainer member serves as the primary means for securing the sleeve in place, various auxiliary means are provided for securing the sleeve in place and fully effective even if the retainer member should fail, either partially or completely. These auxiliary means include direct physical affixation of the sleeve to the work pieces, novel formation of the sleeve itself to provide spring-loaded frictional engagement thereof to the work pieces, and means operable by the retainer itself to increase the loading of said frictional connection and to maintain said loading even if the end enlargements of the retainer, such as the head and/or nut of a bolt, should fracture and fall away.

Other objects are simplicity and economy of construction, efficiency and dependability of operation, and adaptability for use in a wide variety of applications.

With these objects in view, as well as other objects which will appear in the course of the specification, reference will be had to the accompanying drawing, wherein:

FIG. 1 is a top plan view of a pivotal connection embodying the present invention, FIG. 2 is a side elevational view of the connection shown in FIG. 1, FIG. 3 is a side elevational view of the side of the connection shown in FIG. 1, opposite to the side shown in FIG. 2, FIG. 4 is an enlarged sectional view taken on line IV—IV of FIG. 3, with parts left, in elevation.

FIG. 5 is a longitudinal sectional view of the sleeve only as shown in FIG. 4,

FIG. 6 is a sectional view taken on line VI—VI of FIG. 5.

FIG. 7 is a fragmentary view similar to FIG. 4, showing a modified construction, and FIG. 8 is a sectional view taken on line VIII—VIII of FIG. 7.

Like reference numerals apply to similar parts throughout the several views, and the numerals 2 and 4 apply respectively to a pair of links to be joined for relative pivotal movement about an axis transverse to their axes. Link 4 is provided with an end fitting 6 constituting a clevis having a pair of parallel, spaced apart leaves 8 extending longitudinally of the link, and link 2 is provided with an end fitting 10 having a single leaf 12 extending longitudinally of the link and disposed rotatably between leaves 8 of the link 4. A bore 14 formed transversely through leaf 12 is coaxially aligned with bores 16 of equal size formed in leaves 8, and it is intended that links 2 and 4 be relatively pivotable about the common axis of bores 14 and 16. Leaves 8 and 12 will hereinafter for convenience be referred to simply as "work pieces," since it will be readily apparent that the connecting means hereinafter described is readily adapted for connecting work pieces other than the leaves of a clevis-type pivotal joint.

The connection as contemplated by the present invention includes in essence a safety sleeve designated generally by the numeral 18 and a retainer member indicated generally by the numeral 20. Safety sleeve 18 comprises a tubular body portion 22 formed of resilient material such as spring steel, and having a peripheral flange 24 at one end thereof. Body portion 22 is longitudinally split as indicated at 26, and said split also extends through flange 24, as best shown in FIGS. 5 and 6. Said body portion is adapted to be inserted into bores 14–16 of the work pieces, and is preferably normally of somewhat larger external diameter than said bores, whereby it is resiliently compressed to a smaller diameter as it is driven into said bores, so as to fit therein with a tight frictional grip which will nevertheless permit relative pivotal movement of the links. Flange 24 overlies one of the exposed faces of the work pieces, and a spring washer 28 may be inserted therebetween. Flange 24 is also provided with one or more radially extending ears 30 (see FIG. 6), each having a perforation 32 formed therethrough for receiving a wire 34 for attaching the safety sleeve directly and physically to the work pieces, as shown. In the species of the invention shown in FIGS. 1–6, it will be seen that the end portion of body portion 22 opposite from flange 24 is normally inwardly tapered, both internally and externally, as best shown in FIG. 5 at 36, and that the extreme end portion thereof is internally threaded as indicated at 38. In this species of the invention, retainer 20 constitutes an ordinary bolt having a diameter permitting it to be slidably inserted through body portion 22 of the sleeve when said sleeve is resiliently compressed by its insertion in bores 14 and 16 of the work pieces, but to fit snugly in the sleeve. The threads 40 of the bolt shank are of such length that when head 42 abuts flange 24 as shown, said threads extend through the normally tapered portion 36 of the sleeve. Thus as the bolt is inserted into the sleeve and threaded into threads 38 of the sleeve, it expands the tapered portion 36 into full engagement with the bore of the work pieces, as shown in FIG. 4, so as to provide extremely tight frictional binding thereof in said bore. Preferably the tapered portion 36 of the sleeve is confined to the bore of only one of the work pieces, in order that the tight frictional binding thereof will not objectionably interfere with the relative pivotability of the work pieces. Finally, the bolt is secured in position by a nut 44 threaded on the extended end thereof, with a washer 46 interposed between the nut and the adjacent surface of the work pieces. Said nut may be of a locking type, secured against rotation on the bolt, once it has been set, by any suitable means such as a cotter pin 48 inserted through a hole 50 formed transversely in the bolt and engaged in any of a plurality of slots 52 formed diametrically in the nut.

Considering first the operation of the species of the invention shown in FIGS. 1–6, it will be seen that it provides several features contributing to a high degree of safety. Body portion 22 of sleeve 18 provides the support for the work pieces permitting relative pivotal movement thereof, while retainer bolt 20 provides the primary means securing the sleeve in position and in proper assembly. Joints of this general type most commonly utilize a bolt only, with no sleeve at all, but are subject to failure for any of several causes. For example, cotter pin 48, or any other locking device of nut 44, may shear or otherwise fail due to vibration, metal fatigue or the like, allowing the nut to come unscrewed from the bolt, so that the bolt may fall out and be lost. Metal fatigue may also cause fracture failure of the bolt shank at its normal points of maximum stress concentration, such as at the joinder of the shank to head 42, or at the roots of threads 40 at the inner side of nut 44, thus allowing either the bolt head, or the nut and the portion of the shank threaded therein, to fall away so as to permit the entire bolt to fall out and be lost. Any of these occurrences can of course have disastrous results in aircraft control linkages, and are the known or suspected cause of many crashes.

Bolt 20 of the present invention is still subject to possible failure due to any of the above enumerated occurrences, but in such event the joint will be maintained safe by sleeve 18 and its related elements. For example, if nut 44 should work loose and fall free, the engagement of bolt threads 40 in sleeve threads 38 will retain the bolt itself in position to keep sleeve body 22 expanded into tight frictional engagement with the bores of the work pieces, so that said sleeve would be extremely unlikely to work longitudinally out of said bores due to vibration or any other cause. The same action occurs even if both the bolt head and nut should fracture and fall away, the thread connection 36–38 serving to retain the major portion of the bolt shank within the sleeve. It is extremely unlikely that the bolt shank itself would ever be lost. The bolt shank then serves the valuable function of supporting the joint against yielding transversely to its axis, as by a stress longitudinal to links 2 and 4, which transverse yielding could otherwise occur by resilient compression of the sleeve, and closure of split 26 thereof, if the bolt were entirely lost. However, even if the bolt should be entirely lost, the sleeve is so designed that its resilient expansibility, even without the internal support of the bolt, is sufficient to support all normal transverse loads on the joint, and in any event the maximum transverse yielding of the joint which could be permitted by closure of split 26 of the sleeve would not normally be so great as to be fatal to the operation of the joint. Whether the frictional grip of the sleeve in the work piece bores is great as provided by expansion of tapered sleeve threads 38 by the bolt threads, or is relatively slight if the bolt is entirely lost, the sleeve is prevented from being vibrated longitudinally out of said bores by wires 34, which resist such movement by their direct connection to the work piece themselves. These wires need not be particularly tight, and can be connected to the two different work pieces if the angle of pivotal movement required is not great. If greater angles are required, both wires should be attached to a single work piece. At least two wires are preferred, so as to leave one operative if the other should fail. In this connection, the work piece adjacent sleeve flange 24 could be drilled and tapped to receive screws passing through flange perforations 32. However, the drilling and tapping of the work piece would weaken it and create additional points of stress concentration, and for this reason, the wires are preferred. Spring washer 28 serves to relieve stresses which would otherwise tend to concentrate at the angle between body portion 22 and flange 24 of the sleeve, and also applies a longitudinal stress to the joint tending to prevent looseness or rattling of the parts when the joint becomes somewhat worn, such rattling or relative movement of parts contributing to accelerated vibration fatigue of the parts. This latter function is particularly useful where the sleeve is not internally threaded at 38, as would be the case in some forms of the invention. Also, a spring washer could be substituted for plain washer 46 under the nut.

In the form of the invention shown in FIGS. 7 and 8, the safety sleeve 18 is substantially identical with that shown in FIGS. 1–6, except that tapered portion 36 and threads 38, as shown in FIGS. 1–6 are omitted. However, the retainer member indicated generally at 20, instead of constituting a bolt as in FIGS. 1–6, constitutes a member very similar to sleeve 18, except that it is of course of smaller diameter so as to fit slidably but snugly into sleeve 18. Sleeve 20 comprises a tubular cylindrical body portion 54 having a flange 56 formed at one end thereof, and both the body portion and the flange may be longitudinally split in the same manner as sleeve 18, as indicated at 58 in FIG. 8. This retainer is inserted into sleeve 18 after sleeve 18 is inserted into the work pieces, with the flange 56 of sleeve 20 at the opposite side of the work pieces from flange 24 of sleeve 18, so as to cooperate with washer 46. Body portion 54 is normally of slightly greater internal diameter than the internal diameter of sleeve 18, so that the former is resiliently compressed to a smaller diameter as it is driven into the latter. Body portion 54 is of sufficient length to extend through and somwhat beyond flange 24 of sleeve 18, and a washer 60 is applied over the extended end portion thereof. A hole 62 is formed diametrically through this extended portion just outwardly from washer 60, and one or more wires 64 are threaded through said holes. These wires can then be threaded through perforations 32 of ears 30 and secured by twisting the ends thereof together, as shown, or could be wrapped around the work pieces in the same manner as wires 34 in FIGS. 1–6. Also, in FIG. 7, wires 34 could be threaded through perforations 32 and wrapped about the work pieces, in addition to the wires 64 shown. Also, flange 56 of sleeve 20 could be formed with perforated ears and secured by wires to the work pieces, in the same manner as flange 24 in FIG. 4, if desired.

The principal difference of function between the FIG. 4 and FIG. 7 species of the invention is that in the FIG. 7 species the retainer member 20 is also retained by friction in the outer sleeve 18 in the vent wires 64 should fail or shear, or if flange 56 or the opposite end of the retainer should fracture, while in FIG. 4 the bolt is not so retained, but only by threads 38, if said threads are used. Also, the FIG. 7 species is particularly suited for use where the diameter of the sleeves must necessarily be small, since the retainer sleeve in FIG. 7 is not threaded. In bolts of small diameter, the threading seriously weakens the bolt shank, causing dangerous stress concentrations, and planes of easy shear failure, at the roots of the threads. The wire holes 62 in FIG. 7 cause considerably less weakening, and are hence preferably to threading when the retainer must be of small diameters, say 3/16 inch or less.

While I have shown and described certain specific embodiments of my invention, it will be readily apparent that many minor changes of structure and operation could be made.

What I claim as new and desire to protect by Letters Patent is:

1. A safety pivot connection for connecting work pieces having coaxially aligned bores of equal diameter formed therethrough and opening through distal faces of said work pieces, said pivot connection comprising:
   (a) a tubular cylindrical sleeve inserted snugly in said bores and extending substantially therethrough,
   (b) an elongated retainer member extending coaxially through said sleeve and outwardly from the distal faces of said work pieces, said retainer member constituting a tubular cylindrical body member of a diameter to fit snugly into said sleeve,
   (c) a first enlargement affixed to one end of said retainer member and overlying one of said faces, said first enlargement constituting a flange affixed to one end of said body member, said body member extending outwardly from the opposite end of said sleeve an beyond the distal face of said work pieces,
   (d) a second enlargement detachably affixed to the opposite end of said retainer member and overlying the other of said faces, said second enlargement constituting means connected to the extended end of said body member, said retainer member and enlargements constituting a primary means securing said sleeve in said bores, and
   (e) means independent of said retainer member and enlargements for securing said sleeve in said bores.

2. A safety pivot connection as recited in claim 1 wherein the body portion of said retainer member is longitudinally split, is formed of resilient material, and has an external diameter, when unstressed, slightly greater than the internal diameter of said sleeve, whereby said body member is resiliently compressed as it is inserted into said sleeve, said split extending radially through said flange.

3. A safety pivot connection as recited in claim 1 wherein said second enlargement constitutes a wire threaded through a hole formed transversely through the extended end portion of the body member of said retainer, and connected to said sleeve to inhibit relative longituinal movement of said sleeve and said retainer member.

References Cited

UNITED STATES PATENTS

| | | | |
|---|---|---|---|
| 184,888 | 11/1876 | Munzinger | 14—14 |
| 3,126,568 | 3/1964 | Wubbe | 287—96 X |
| 3,188,895 | 6/1965 | Jones | 287—96 X |
| 256,293 | 4/1882 | Cooper | 287—100 X |
| 1,971,159 | 8/1934 | Laurent | 285—80 X |
| 2,299,183 | 10/1942 | Shanor | 285—80 X |
| 2,379,786 | 7/1945 | Bugg | 85—84 |
| 2,386,729 | 10/1945 | Watter | 85—4 |

FOREIGN PATENTS 52,040   6/1943   France.

CARL W. TOMLIN, Primary Examiner

WAYNE L. SHEDD, Assistant Examiner

U.S. Cl. X.R.

287—93, 96